(12) United States Patent
Ebsen et al.

(10) Patent No.: US 7,380,113 B2
(45) Date of Patent: May 27, 2008

(54) METHOD FOR UPDATING MEMORY RESIDENT FIRMWARE AS A BACKGROUND OPERATION

(75) Inventors: David S. Ebsen, Chaska, MN (US);
Todd R. Burkey, Savage, MN (US);
Steven M. Howe, Rochester, MN (US);
Randal S. Rysavy, Kasson, MN (US)

(73) Assignee: Xiotech Corporation, Eden Prairie, MN (US)

( * ) Notice: Subject to any disclaimer, the term of this patent is extended or adjusted under 35 U.S.C. 154(b) by 569 days.

(21) Appl. No.: 10/430,607

(22) Filed: May 5, 2003

(65) Prior Publication Data

US 2003/0217257 A1 Nov. 20, 2003

Related U.S. Application Data

(60) Provisional application No. 60/381,428, filed on May 17, 2002.

(51) Int. Cl.
*G06F 9/24* (2006.01)
(52) U.S. Cl. .......................................... 713/1; 713/100
(58) Field of Classification Search .................... 713/1, 713/100
See application file for complete search history.

(56) References Cited

U.S. PATENT DOCUMENTS

| | | | |
|---|---|---|---|
| 6,675,258 B1 * | 1/2004 | Bramhall et al. | 711/114 |
| 6,728,833 B2 * | 4/2004 | Pruett et al. | 711/114 |
| 6,816,950 B2 * | 11/2004 | Nichols | 711/162 |
| 6,988,182 B2 * | 1/2006 | Teachman et al. | 712/37 |

* cited by examiner

*Primary Examiner*—Rehana Perveen
*Assistant Examiner*—Eric Chang
(74) *Attorney, Agent, or Firm*—Beck & Tysver, PLLC

(57) ABSTRACT

A method of upgrading firmware during background operation in a storage area network (SAN) including at least one storage controller having programmable memory and RAM, where the at least one storage controller for controls data access between at least one host server and at least one storage device. The method includes temporarily suspending data access commands from the at least one host server, upgrading firmware stored in programmable memory, and copying a current version of firmware in a first memory address of RAM to a second memory address in the RAM. The current version of firmware in the first memory address in RAM is overwritten with the upgraded version of firmware. The controller is reinitialized, and data access commands from the at least one host server to the at least one storage device are provided by the at least one storage controller.

20 Claims, 5 Drawing Sheets

METHOD FOR UPDATING MEMORY RESIDENT FIRMWARE AS A BACKGROUND OPERATION

RELATED APPLICATIONS

This application relates to and claims priority from U.S. application Ser. No. 60/381,428, filed May 17, 2002, and entitled "FLASH ON THE FLY", the disclosure of which is hereby incorporated by reference in its entirety.

FIELD OF THE INVENTION

The present invention relates to storage area networks and, more particularly, to upgrading storage area network firmware.

BACKGROUND OF THE INVENTION

Networked attached storage (NAS) and storage area networks (SANs) are two recent technologies that attempt to allow computers to access network-connected hard disk drives and other mass storage devices using block-level commands so that the networked storage appears to be accessed as if it were physically attached to the workstation. In a NAS, the storage device connects directly to the network medium and does not require an intermediate server to provide access to the storage. In a SAN, a separate network of storage devices forms storage space that is allocated to different workstations and this separate network is itself connected to the network medium, which connects the different workstations.

Conventional SANs do not perfectly solve all the mass storage needs for an enterprise. In particular, maintenance and provisioning of the storage space within the conventional SAN is difficult to accomplish and wasteful of the physical resources. To address these concerns, many recent developments in this field have involved virtualizing the storage space so that there is little, or no, correlation between the physical disk drive devices where the data actually resides and the logical disk drive devices which are the targets for a workstation's data access request. One such currently produced product that is known in the industry and provides a substantially virtualized view of the storage space within a SAN is the MAGNITUDE® SAN manufactured by Xiotech Corporation of Eden Prairie, Minn.

The MAGNITUDE® SAN aggregates physical drives into a centralized "virtualized" storage pool and has the ability to stripe across and utilize all available space in a centralized storage pool. From this pool, a user carves out storage into "virtualized disks" and assigns that storage to whichever workstation that needs it. Within the SAN, the workstations see the MAGNITUDE® SAN's virtual disks as Logical Unit Numbers (LUNs). Within MAGNITUDE® SAN, virtualization refers to different levels of logical constructs rather than to physical storage devices (e.g. SCSI hard disk drives).

The MAGNITUDE® SAN is responsible for presenting the available virtualized disks as addressable devices on the Fibre Channel fabric. As a result, remote servers and workstations need only generate a typical block-level command (e.g., SCSI-3 command) to access blocks on an available logical drive. The MAGNITUDE® SAN, however, receives this conventional protocol request and converts it into a virtual request packet (VRP) for internal processing. The MAGNITUDE® SAN internally unencapsulates, parses and processes a VRP message utilizing translation tables in order to eventually generate SCSI commands to access multiple SCSI devices.

The MAGNITUDE® SAN enforces access controls at the virtualized disk level. Individual virtualized disks can be assigned to a specific workstation to allow the workstation and its storage to be isolated from another workstation and its storage.

Within the MAGNITUDE® SAN system, for example, there is at least one controller having firmware, that when executed, performs the many levels of translations needed to permit receiving a request involving a virtualized drive and actually performing data accesses to multiple physical devices.

The firmware in the controllers occasionally requires upgrades to improve performance. However, the servers and workstations must be powered down during such firmware upgrades. Accordingly, being denied access during these firmware upgrades may inconvenience customers utilizing the SAN. There remains the need, therefore, for a method of upgrading firmware in a controller without inconveniencing the users of the system.

SUMMARY OF THE INVENTION

These and other needs are met by embodiments of the present invention, which provides a method of upgrading firmware during background operation in a storage area network (SAN) including at least one storage controller having programmable memory and RAM, where the at least one storage controller controls data access between at least one host server and at least one storage device. The method includes temporarily suspending data access commands from the at least one host server, upgrading firmware stored in programmable memory, and copying a current version of firmware in a first memory address of RAM to a second memory address in the RAM.

The current version of firmware in the first memory address in RAM is overwritten with the upgraded version of firmware. The controller is reinitialized, and data access commands from the at least one host server to the at least one storage device are provided by the at least one storage controller.

BRIEF DESCRIPTION OF THE DRAWINGS

The present invention is described with reference to the following figures.

To facilitate understanding, identical reference numerals have been used, where possible, to designate identical elements that are common to the figures.

DETAILED DESCRIPTION OF THE INVENTION

In the following description, for purposes of explanation, numerous specific details are set forth in order to provide a thorough understanding of the present invention. It will be apparent, however, to one skilled in the art that the present invention may be practiced without these specific details. In other instances, well known structures and devices are shown in block diagram form in order to avoid unnecessarily obscuring the present invention.

The present invention includes a method for upgrading firmware in a controller that controls disk access command, illustratively, sent from a host (e.g., one or more servers) to a storage device (e.g., storage array). The firmware upgrade is performed in the background of normal server operations, without having to power down the servers, which is costly in terms of productivity and efficiency by users of the servers and storage device.

Exemplary Storage Area Network

Figure 1:
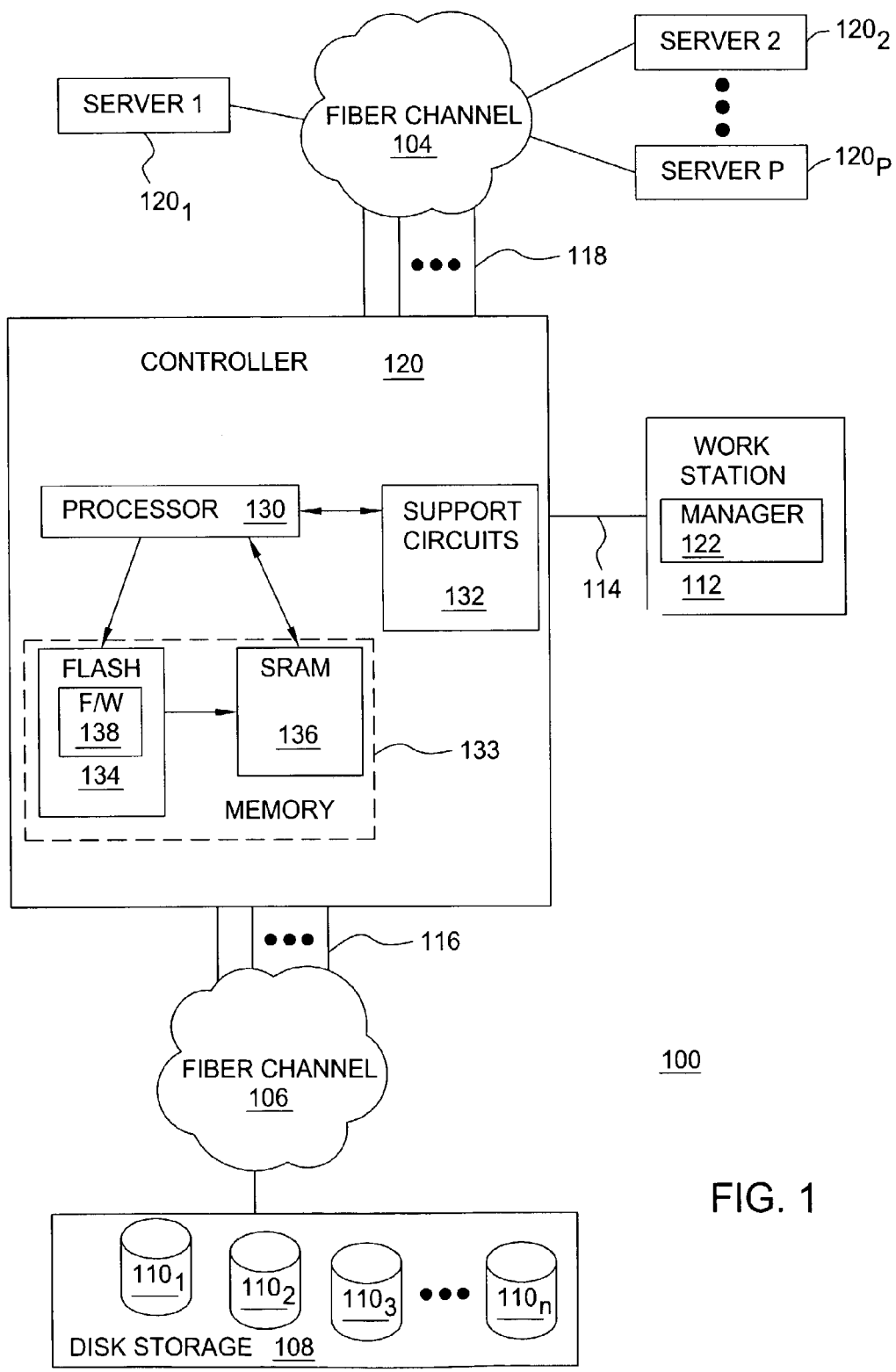
FIG. 1 depicts a block diagram of an exemplary fibre channel storage area network (SAN)

FIG. 1 depicts a block diagram of an exemplary fibre channel storage area network (SAN) 100. Embodiments of the present invention can provide conventional functionality and operation within this environment 100. The SAN environment 100 comprises at least one server 120, a controller 102, a workstation 112, and a disk storage subsystem 108. In particular, a plurality of individual disk drives $110_1$ through $110_n$ (collectively disk drives 110) is connected together to form the storage subsystem 108.

This storage subsystem 108 is connected via fibre channel media 106 and protocols to different back-end interfaces 116 of the controller 102. The disk storage subsystem connections as depicted in FIG. 1 are schematic in nature. The actual physical connection topology of the different disk drives 110 to the controller 102 is not explicitly depicted in FIG. 1, as numerous different topologies are recognized to be functionally equivalent.

One exemplary topology may be to have four fibre channel loops, each loop having plural hard drives and each loop connected to a different interface 116 of the controller 102. The exemplary network environment 100 is implemented using fibre channel; however, the use of other present and future-developed networking technologies providing similar functionality are also contemplated.

Within the environment 100, a number of servers $120_1$ through $120_p$ (collectively servers 120) are connected to various front-end interfaces 118 of the controller 102. These connections also utilize fibre channel media 104 to provide various connection topologies between the servers 120 and the controller 102. For example, the fibre channel media 104 may include one or more switches (not shown) having respective output ports connected to a front-end controller interface 118 and input ports connected to individual servers 120 or loops of individual servers.

The controller 102 is responsible for presenting storage space to the servers 120 by directing and controlling access to the disk storage subsystem 108. This access is not dependent on the underlying physical arrangement and structure of the disk drives 110; but, rather, is provided in a virtual (or logical) manner, thereby simplifying maintenance and management of the storage space made available to the servers 120. In operation, the controller 102 presents to each server $120_1$ to $120_p$ respective logical disk drives that can be accessed as if they were physical disk drives connected to the server. The servers 120 send data access requests (e.g., read, write, copy, etc.) to the controller 102 directed to a particular logical disk drive and the controller 102 translates the request into commands that access data on the physical drives 110. For example, with a read request, the controller 102 also arranges any retrieved data and provides it back to the requesting server $120_p$.

FIG. 1 further depicts a high-level block diagram of the controller 102 suitable for use in the SAN environment 100 of FIG. 1. Specifically, the controller 102 comprises a processor 130 as well as memory 133, such as programmable permanent memory 134 (e.g., Flash memory) and RAM 136 (e.g., SRAM) for storing various control programs 138. The processor 130 cooperates with conventional support circuitry 132 such as power supplies, clock circuits, cache memory and the like as well as circuits that assist in executing the software routines stored in the memory 133. As such, it is contemplated that some of the process steps discussed herein as software processes may be implemented within hardware, for example as circuitry that cooperates with the processor 130 to perform various steps. The controller 102 also contains input/output (I/O) circuitry that forms an interface between the various functional elements communicating with the controller 102. For example, in the embodiment of FIG. 1, the controller 102 communicates with the back-end and front-end interfaces 116 and 118, as discussed below in further detail with regard to FIG. 2. The controller 102 may also communicate with additional functional elements (not shown).

Although the controller 102 of FIG. 1 is depicted as a general-purpose computer that is programmed to perform various control functions in accordance with the present invention, the invention can be implemented in hardware as, for example, an application specific integrated circuit (ASIC). As such, the process steps described herein are intended to be interpreted broadly, as well as being equivalently performed by software, hardware, or a combination thereof.

The creation and modification of the storage configuration implemented by the controller 102 is accomplished via a workstation 112. The workstation 112 connects to the controller 102 via a network connection 104, such as Ethernet, and facilitates a storage configuration manager 122 that interacts with the controller 102. The storage configuration manager 122, for example, can be presented via a web server such that a user can configure the controller 102 using a web browser on workstation 112. Alternatively, the storage configuration manager 122 can be a standalone application that communicates with the workstation 112 via TELNET or possibly a proprietary client application. Utilizing the storage configuration manager 122, a user such as a system administrator can define, for example, the storage space (and its configuration) that is allocated to each of the servers 120. For example, to allocate storage to server $120_2$, a user interfaces with the storage configuration manager 122 to specify, illustratively, that a new disk is needed, the new disk is a logical or virtual disk rather than a physical disk, RAID level, and the like. The specific algorithm and manner in which the physical disk drives 110 are presented as virtual disk space to the servers 120 are not critical to the understanding of the exemplary embodiments of the present invention. Accordingly, this virtualization is mentioned so as not to obscure the present invention but, rather, is described to allow a clear understanding of the many aspects of the system.

The servers 120 are able to determine which front-end (FE) interface 118 to send a particular request based on a target identifier. The controller 102 receives a data request on the FE interface 118 and, through a process of multiple translations using configuration information, accesses the appropriate physical drives 110 to satisfy the request.

Figure 2:
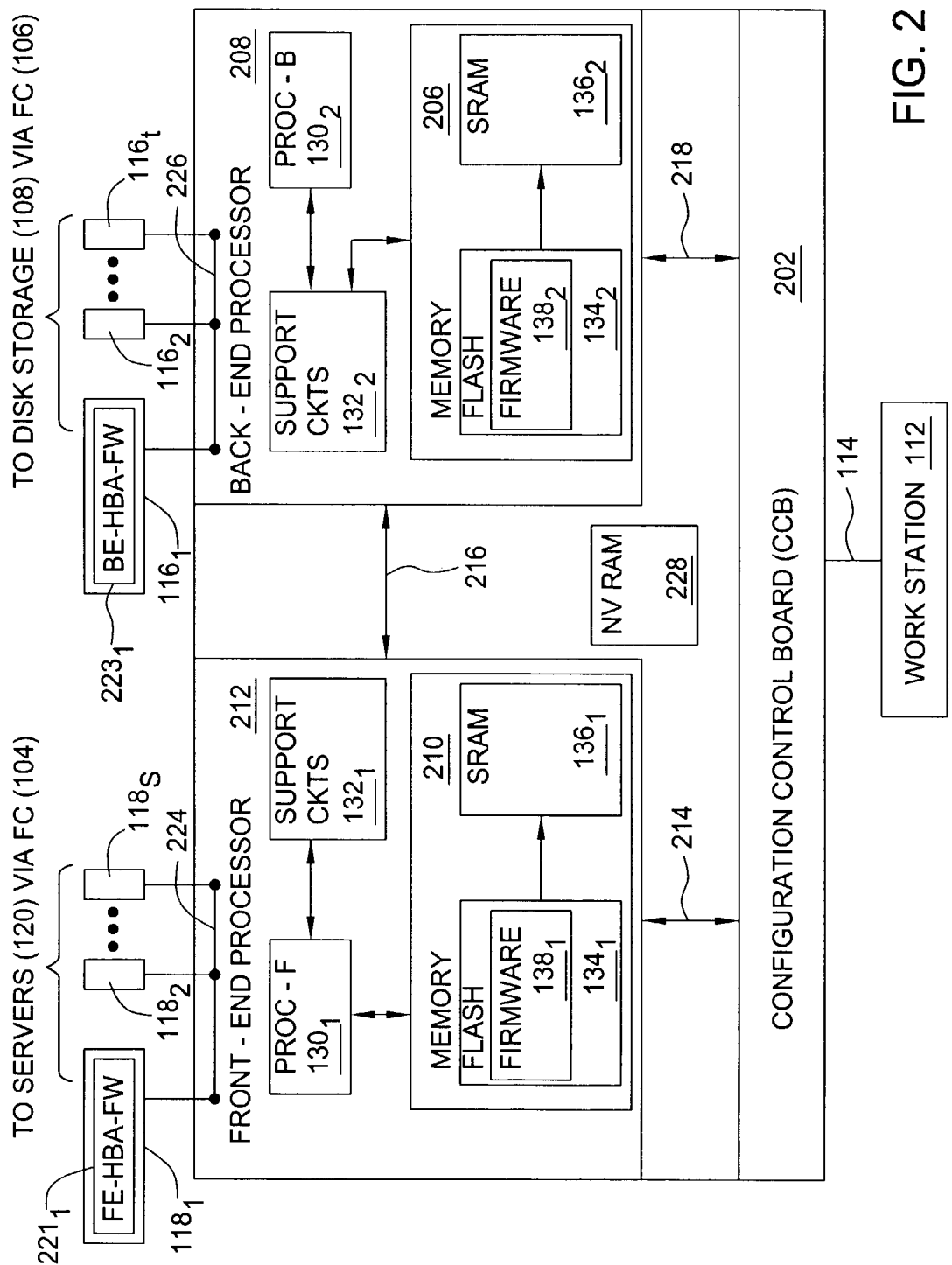
FIG. 2 depicts a block diagram of an exemplary data storage controller for accessing data in a storage array of FIG. 1.

FIG. 2 depicts a block diagram of an exemplary data storage controller 201 for accessing data in a storage array 108 of FIG. 1. The controller 201 depicted in FIG. 2 is one is illustratively utilized in the MAGNITUDE® storage area network (SAN), manufactured by Xiotech Corporation of Eden Prairie, Minn.

According to this embodiment, the controller 201 comprises three major processors: a front-end processor 212, a back-end processor 208, and a configuration and control board (CCB) 202. Also included within the controller 201 is non-volatile RAM (NVRAM) 228, or other functionally equivalent storage that is accessible by the front-end 212 and back-end 208 processors to retain a copy of the system configuration information.

The front-end processor 212 is coupled via a bus 224 to plural front-end interfaces 118, such as fibre channel host bus adapters (HBAs) $118_1$ to $118_s$ (collectively front-end (FE) HBAs 118). It is noted that a HBA is synonymous with a host adapter board (HAB), which reflects terminology used by some vendors.

In one specific embodiment, the bus 224 is a PCI bus and the HBAs 220 are Qlogic® Fibre Channel interface boards. Each FE-HBA $118_1$ to $118_s$ connects with one or more of the servers 120. This side of the controller 102 is referred to as the "front-end" or the "host end" which makes the FE-HBAs 118 "host interfaces". It is noted that each of the FE-HBAs 220 may have associated firmware (e.g., firmware $221_1$) to control functional aspects of the FE-HBA 220. In one embodiment, the firmware 221 is stored in a programmable memory (e.g., Flash memory) directly on the FE-HBA 220. Alternatively, the firmware for the HBA's 220 may be stored in the programmable memory 134 on the FE processor 212.

The front-end processor 212 serves as a "controller" that comprises a processor $130_1$ and support circuitry $132_1$ as discussed with regard to FIG. 1. The processor $130_1$ may be a microprocessor such as an Intel i960® type processor. The front-end processor 212 also includes memory 210 comprising RAM (e.g., SRAM) $136_1$ that caches incoming and outgoing commands and data, as well as programmable (e.g., Flash) memory $134_1$ that stores the front-end processor's firmware $138_1$. Incoming disk access requests are received via the host interfaces 118. The front-end processor 212 uses the configuration information in NVRAM 228 to determine which blocks of the virtual disk the access request relates to, and then passes this information to the back-end processor 208. The front-end processor 212 and back-end processor 208 are connected via a bus 216, such as a PCI bus.

The back-end processor 208 is coupled to plural back-end interfaces 116, such as fibre channel host bus adapters (HBAs) $161_1$ to $116_t$ (collectively back-end (BE) HBAs 116) via a bus 226. This side of the controller 201 is referred to as the "back-end" or the "device end" that forms the BE-HBAs 116 "device interfaces". In one specific embodiment, the bus 226 is a PCI bus. Each BE-HBA $116_1$ to $116_t$ connects with one or more of the physical disks 110 of the storage device 108. The back-end processor 208 executes its own firmware code to perform its respective operations. It is noted that each of the BE-HBAs 116 may also comprise firmware (e.g., firmware $223_1$) to control functional aspects of the BE-HBA 116. Similar to the front-end controller 212, the BE-HBAs 116 may have firmware 223 stored in a programmable memory directly on the BE-HBAs 116. Alternatively, the firmware for the HBA's 116 may be stored in the programmable memory 134 on the BE processor 212.

The back-end processor 208 also serves as a "controller" that comprises a processor $130_2$ and support circuitry $132_2$ as discussed with regard to FIG. 1. That is, the processor $130_2$ may also be a microprocessor such as an Intel i960® type processor. The back-end processor 208 also includes memory 206 comprising RAM (e.g., SRAM) $136_2$ that caches incoming and outgoing commands and data, as well as programmable permanent memory $134_2$ that stores the back-end processor's firmware $138_2$. The back-end processor 208 receives, from the front-end processor 212, information about a virtual disk access request and generates the actual, physical disk access commands to access the various blocks of the physical disk drives 110a-110d which correspond to the requested blocks of the virtual disk access request.

Busses 214 and 218, such as PCI busses, connect the CCB 202 to both the front-end 212 and back-end 208 processors, respectively. One alternative to the separate busses 214-218 depicted in FIG. 2 is a single bus that connects all three components 202, 208 and 212. The actual hardware of a CCB 202 is not depicted in FIG. 2, however typically comprises a network interface (such as an i82559 Ethernet Controller), a processor (such as an Intel i960), memory (e.g. RAM, programmable memory, NVRAM, and the like), timer circuitry, and interface circuitry for communicating with the front-end 212 and back-end 208 processors over busses 214 and 218.

The CCB 202 includes management functionality similar to that available from conventional SAN controllers. In other words, the CCB 202 includes an interface for receiving configuration instructions and performing many of the functions needed for allocating and provisioning storage space accordingly. The functions of the CCB 202 include, for example, configuring and controlling RAID devices, backing-up, copying or mirroring data within the storage system 108, and configuring and managing server connections. Additionally, the functions of the CCB 202 may also include maintaining system event logs, monitoring environmental and power conditions, recording operation statistics, providing notification of failures, performing diagnostics, and reporting the status of the controller 201 and the storage subsystem 108 to the workstation 112.

The firmware 138 for the front-end and back-end processors 212 and 208 is permanently stored in the programmable (e.g., Flash) memory 134 associated with each processor 212 and 208. For each processor 212 and 208, the firmware stored in the programmable memory 134 is copied into the SRAM 136 for execution by the processor 130. The SRAM 136 has storage space specifically designated for the microcode copied from the programmable memory 134. The processor 130 interacts with the SRAM 136 to execute the microcode therein to perform the functional aspects of the controller 201. Specifically, the firmware 138 comprises software instruction (e.g., microcode), that when executed by the processor 130, allows the controller 201 to perform specific operations necessary to control data access (i.e., reading and writing data) to and from the disk storage 108.

At times, it may be necessary to correct some deficiency or simply enhance performance of the firmware 138 of the controller 201 and/or the firmware 221 and 223 of the HBAs 118 and 116. Changes to the firmware 138 are made by writing new microcode and then upgrading the current firmware in the system with the new firmware, as discussed in further detail with regard to FIG. 3.

Figure 3A:
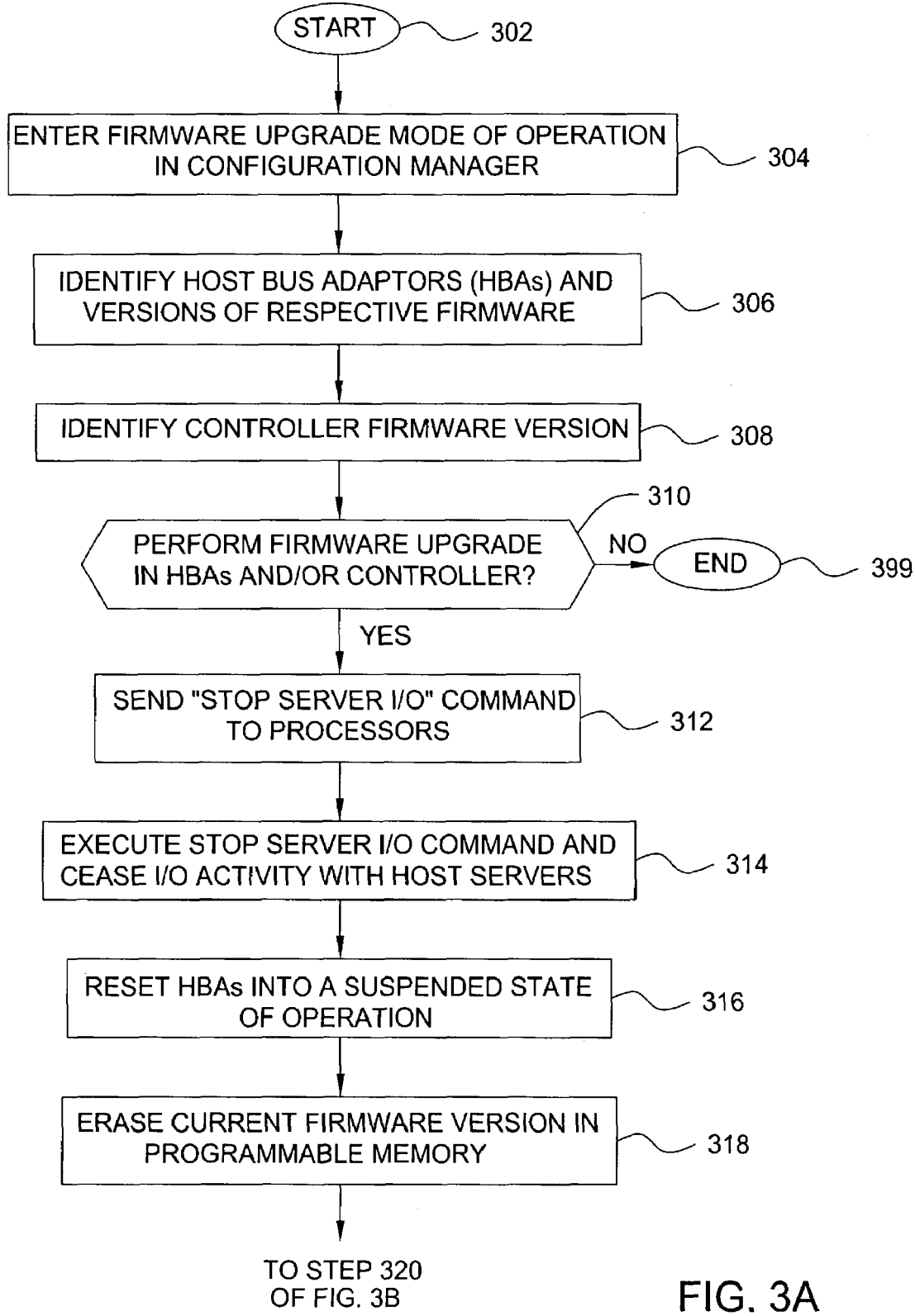
FIGS. 3A-3C depict a flow diagram of an exemplary method for upgrading firmware in the data storage controller of FIG. 2.
Figure 3B:
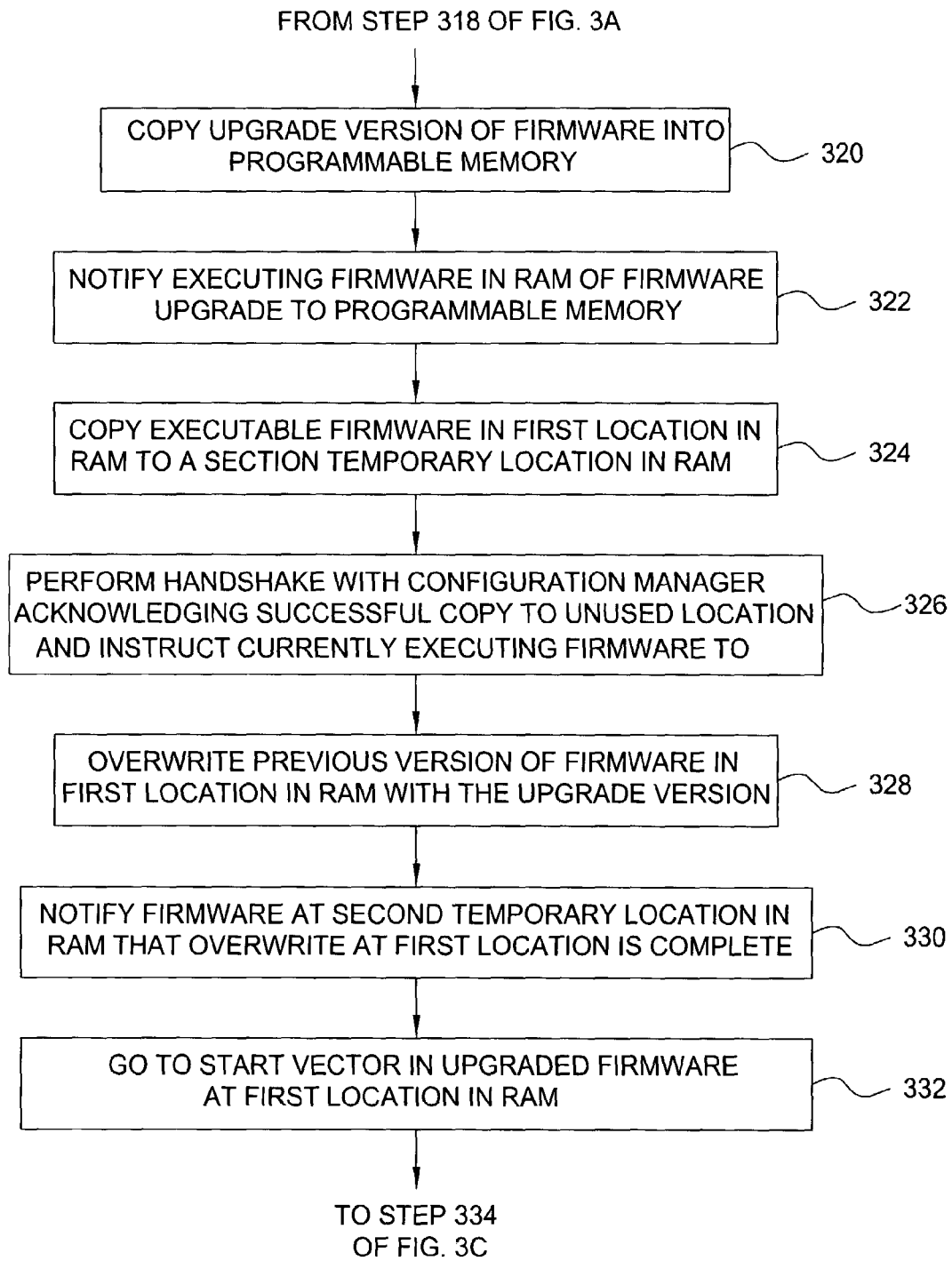
Figure 3C:
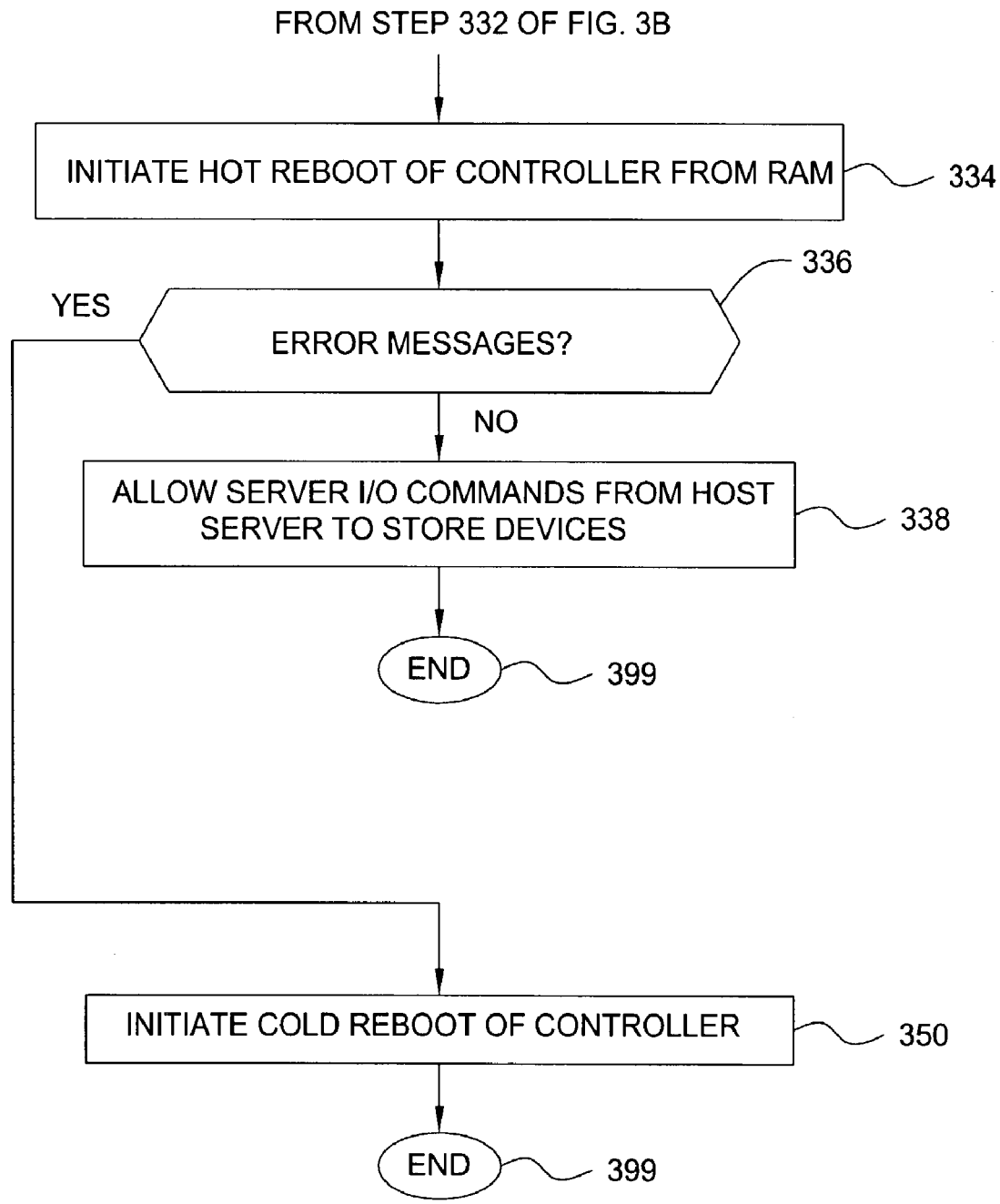

FIG. 3 depicts a flow diagram of an exemplary method 300 for upgrading firmware in the data storage controller 108 of FIG. 2. It is noted that the firmware upgrade may be provided by method 300 for the controller firmware 138 (e.g., firmware on processors 212 and 208) and/or the HBA firmware 221 and 223.

When a host server 120 issues an I/O request to access data (read/write data) from a storage device 108, the I/O request must be satisfied within a certain time period (i.e., window) before the operating system of the server initiates a data access error. The window duration is operating system dependent, and the window is usually at least 25 to 30 seconds long for most of the popular operating systems (e.g., WINDOWS®, LINUX, among other operating systems). The window allows the server to repeat the I/O request for the duration of the window in the event that the previous I/O requests fail.

One inventive feature of method 300 is to provide the firmware upgrade to the programmable memory 134 on the controllers 212 and 208 and the HBAs 116 and 118 within the constraints of the window described above. By performing method 300 within the time constraints allotted by the operating system, the firmware upgrade may be provided without having to power down the host servers 120 or the generation of an error message that may coincide with a loss of data.

The method begins at step 302, where a system administrator accesses a consol of the workstation 112 to access the controller 201 for performing the firmware upgrade. One function of the configuration manager 122 is to provide an interface for performing firmware upgrades of the present invention. At step 304, an administrator uses a configuration manager 122 to interface and provide firmware upgrade commands to the controller 201 of system 100. In one embodiment, the configuration manager is a DOS program that utilizes text commands. Alternatively, a graphical user interface or combination thereof may be implemented to provide the firmware upgrade commands.

At step 306, the host bus adaptors 116 and 118 that are coupled to the controller 201 are identified by their respective firmware versions. It is noted that in the embodiment shown in FIG. 2, the firmware 138 of both controllers 212 and 208, as well as the firmware 221 and 223 of the HBAs 118 and 116 are upgraded contemporaneously. At step 308, the versions of the firmware 138 on the controller 201 are identified and reported to the configuration manager 122.

At step 310, the current version stored in the firmware 223 and 221 of the host bus adapters (HBAs) 116 and 118 is compared to the upgrade version, such that a determination may be made as to whether a firmware upgrade to the controller 201 or the HBAs 116 and 118 is required. If a firmware upgrade is required for any one of the HBAs or the firmware 138 on the controller 201, the method 300 proceeds to step 312. Otherwise, the method 300 proceeds to step 399, where a firmware upgrade is not required, and the method 300 ends.

At step 312, the configuration manager sends a "stop server I/O" command to the processors 130 of the controllers 212 and 208. The stop server I/O command is used to suspend the controllers 212 and 208 from providing data access to the storage devices 108 by the servers 120. At step 314, the HBAs 116 and 118 are reset. Specifically, the HBAs 116 and 118 switch to a suspended state such that they do not interact with either the servers 120 or the storage devices 108, thus reaching the maximum allowed outstanding requests allowed on the fibre as negotiated by the protocol.

At step 316, the processors execute the stop server I/O command and cease I/O activity with the host servers 120. The method 300 then proceeds to step 320.

At step 320, the configuration manager 122 at the workstation 112 copies the upgrade version of the firmware into the programmable memory (e.g., Flash memory) 134 in the controllers 212 and 208. As noted above, the executable microcode is a copy of the firmware stored in the RAM (e.g., SRAM) 136. It is noted that the copy of the executable microcode is stored in RAM, however it is appreciated that other forms of memory (e.g., Flash) may also be utilized. At step 322, the processor 130 notifies the executing microcode in the SRAM of the firmware upgrade to the programmable memory 134. At step 324, a portion of executable firmware in the SRAM 136 is copied to a second temporary (unused) location in the SRAM 136. At step 326, the configuration manager 122 and processors 130 perform a handshake acknowledging successful completion of step 334, and the executing firmware jumps to the second temporary location in the SRAM 136 for continued execution therefrom. The method 300 proceeds to step 328.

At step 328, the previous version of firmware located in the first location of the SRAM 136 is overwritten with the upgraded version. In one embodiment, the upgraded version is copied directly from the programmable memory 134. Alternatively, the upgraded version may be copied from another source (e.g., configuration manager 122). At step 330, the firmware at the second temporary location (memory address) in the RAM is notified that the overwrite step 328 is complete. At step 332, the processor 130 starts executing the firmware from a start vector of the upgraded firmware stored at the first location (memory address) in the SRAM 136.

It is noted that steps 320 through 328 are discussed in terms of updating the firmware 138 of the controllers 201 only. In this embodiment, the firmware of the HBAs 116 and 118 is stored in the memory of the controller 201. In a second embodiment, the HBAs 116 and 118 store their respective firmware 223 and 221 in memory on the HBAs separate and apart from the controller firmware 138. For any of the above-mentioned embodiments, the HBA's firmware is loaded along with that of the controllers 201. When the HBAs are reset (suspended) and then released, the HBAs will load their new version of the firmware during initialization in a similar manner as described in steps 320 through 328 above.

At step 334, the upgraded firmware in the SRAM 136 initiates a "hot-reboot" of the controllers 212 and 208. The hot-reboot is an abbreviated initialization process of the controllers 212 and 208. Specifically, during the hot reboot process, the upgraded firmware interacts with the NVRAM 228, which stores pre-upgrade system configuration information, such as the servers 120 coupled to the controller 210, the virtual devices, the physical devices, and the like. The upgraded firmware scans the physical drive information for failed disk drives, performs a handshake with the HBAs 116 and 118, and reinitializes the firmware of the HBAs.

At step 336, the configuration manager 122 monitors for error messages during the hot reboot of step 334. If at step 336, the hot boot initialization is error free, then the version number of the upgraded firmware is sent to the configuration manager 122 to signify completion of the upgrade, and the method 300 proceeds to step 338. At step 338, method 300 allows the server I/O commands from the host servers 120 to read and write data to the storage devices 108, and at step 399, method 300 ends.

However, if at step 336, the configuration manager 122 receives an initialization error message, then the method 300 proceeds to step 350, where the servers 120 are powered down and the system 100 is rebooted again. That is, any critical errors will halt the process, thereby forcing the user to perform a cold boot. It is noted that if the process is aborted early enough (e.g., within ten minutes since the last failure), the system is left in its previous active state.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for upgrading firmware during background operation in a storage area network comprising at least one storage controller having programmable memory and RAM, said at least one storage controller for controlling data access between at least one host server and at least one storage device, comprising:
   suspending data access commands from said at least one host server;
   upgrading firmware from a current version of firmware stored in programmable memory;
   copying the current version of firmware in a first memory address of RAM to a second memory address in the RAM;
   overwriting the current version of firmware in the first memory address in RAM with the upgraded version of firmware;
   reinitializing the at least one storage controller; and
   provisioning data access commands from said at least one host server to said at least one storage device prior to receiving a data access error message.

2. The method according to claim 1, wherein prior to the suspending step, the current version of the firmware in the programmable memory is identified.

3. The method according to claim 1, wherein the suspending step is initiated from a configuration manager.

4. The method according to claim 1, wherein the suspending step is respectively sent to at least one processor of said at least one controller.

5. The method according to claim 1, wherein prior to said upgrading step, said programmable memory is erased.

6. The method of claim 1, wherein said reboot step is initiated from the upgraded version of firmware in the first memory address in said RAM.

7. The method of claim 6, wherein during said hot reboot step the upgraded version of the firmware is sent to a configuration manager.

8. The method according to claim 6, wherein said reboot step is an abbreviated reboot comprising:
   initializing host bus adaptors (HBAs) coupled to the at least one controller;
   scanning physical drive information for failures;
   clearing said second memory address in the RAM; and
   notifying a configuration manager that the firmware upgrade is complete.

9. The method according to claim 1, wherein said upgrading firmware stored in programmable memory step comprises upgrading firmware for at least one host adapter bus.

10. The method according to claim 9, wherein said at least one host adapter bus is reset to a suspended state.

11. A computer readable medium in a general purpose computer system that operates as a special purpose controller when executing at least one program for upgrading firmware in a storage area network comprising at least one storage controller having programmable memory and RAM, said at least one storage controller for controlling data access between at least one host server and at least one storage device, comprising:
   suspending data access commands from said at least one host server;
   upgrading firmware from a current version of firmware stored in programmable memory;
   copying the current version of firmware in a first memory address of RAM to a second memory address in the RAM;
   overwriting the current version of firmware in the first memory address in RAM with the upgraded version of firmware;
   reinitializing the at least one storage controller; and
   provisioning data access commands from said at least one host server to said at least one storage device prior to receiving a data access error message.

12. The computer readable medium according to claim 11, wherein the suspending step is initiated from a configuration manager.

13. The computer readable medium according to claim 11, wherein the suspending step is respectively sent to at least one processor of said at least one controller.

14. The computer readable medium according to claim 11, wherein prior to said upgrading step, said programmable memory is erased.

15. The computer readable medium of claim 11, wherein said reboot step is initiated from the upgraded version of firmware in the first memory address in said RAM.

16. The computer readable medium of claim 15, wherein during said hot reboot step the upgraded version of the firmware is sent to a configuration manager.

17. The computer readable medium according to claim 15, wherein said reboot step is an abbreviated reboot comprising:
   initializing host bus adaptors (HBAs) coupled to the at least one controller;
   scanning physical drive information for failures;
   clearing said second memory address in the RAM; and
   notifying a configuration manager that the firmware upgrade is complete.

18. The computer readable medium according to claim 11, wherein said upgrading firmware stored in programmable memory step comprises upgrading firmware for at least one host adapter bus.

19. The computer readable medium according to claim 18, wherein said at least one host adapter bus is reset to a suspended state.

20. Apparatus for upgrading firmware during background operation in a storage area network comprising at least one storage controller having programmable memory and RAM, said at least one storage controller for controlling data access between at least one host server and at least one storage device, comprising:
   means for suspending data access commands from said at least one host server;
   means for upgrading firmware from a current version of firmware stored in programmable memory;
   means for copying the current version of firmware in a first memory address of RAM to a second memory address in the RAM;
   means for overwriting the current version of firmware in the first memory address in RAM with the upgraded version of firmware;
   means for reinitializing the at least one storage controller; and
   means for provisioning data access commands from said at least one host server to said at least one storage device prior to receiving a data access error message.

* * * * *